United States Patent
Erickson et al.

(10) Patent No.: US 7,761,425 B1
(45) Date of Patent: Jul. 20, 2010

(54) LOW-OVERHEAD MEANS OF PERFORMING DATA BACKUP

(75) Inventors: Mark Erickson, Brooklyn Park, MN (US); Wim DeWispeleare, Lochristi (BE)

(73) Assignee: Symantec Corporation, Mountain View, CA (US)

( * ) Notice: Subject to any disclaimer, the term of this patent is extended or adjusted under 35 U.S.C. 154(b) by 138 days.

(21) Appl. No.: 11/693,370

(22) Filed: Mar. 29, 2007

(51) Int. Cl.
*G06F 17/30* (2006.01)
(52) U.S. Cl. ................................................. 707/649
(58) Field of Classification Search ............... 707/204, 707/104.1, 649; 711/162
See application file for complete search history.

(56) References Cited

U.S. PATENT DOCUMENTS

| | | | |
|---|---|---|---|
| 6,389,433 | B1 | 5/2002 | Bolosky et al. |
| 6,513,051 | B1 | 1/2003 | Bolosky et al. |
| 6,920,537 | B2 | 7/2005 | Ofek et al. |
| 6,983,345 | B2 | 1/2006 | Lapir et al. |
| 7,200,604 | B2 | 4/2007 | Forman et al. |
| 7,310,644 | B2 | 12/2007 | Adya et al. |
| 7,359,920 | B1 * | 4/2008 | Rybicki et al. ........... 707/104.1 |
| 7,366,836 | B1 | 4/2008 | Todd et al. |
| 7,376,681 | B1 | 5/2008 | Todd et al. |
| 7,424,514 | B2 | 9/2008 | Noble et al. |
| 7,478,113 | B1 | 1/2009 | De Spiegeleer et al. |
| 2003/0061456 | A1 * | 3/2003 | Ofek et al. ................. 711/162 |

OTHER PUBLICATIONS

U.S. Appl. No. 11/693,378, entitled "Selectable Use of Single-Instance Store Backup Methodology in Combination with Other Methods", filed Mar. 29, 2007.

* cited by examiner

*Primary Examiner*—Etienne P LeRoux
(74) *Attorney, Agent, or Firm*—Rory D. Rankin; Meyertons Hood Kivlin Kowert & Goetzel, P.C.

(57) ABSTRACT

A system and method for data backup. A computer system includes clients coupled to backup server and single instance store via a network. Prior to requesting an initial data backup, a new client segments and fingerprints the data to be backed up. The new client creates a sorted list of hash values and removes duplicate values in the list. In response to receiving the sorted list, a backup server may further reduce the sorted list to a unique list by removing hash values corresponding to data segments already residing on the single instance store. In response to receiving the unique list, the new client may transmit corresponding data segments to the backup server via the network. The transmitted data segments are added to a single instance store.

19 Claims, 5 Drawing Sheets

LOW-OVERHEAD MEANS OF PERFORMING DATA BACKUP

BACKGROUND OF THE INVENTION

1. Field of the Invention

This invention relates to computer systems, and more particularly, to efficient methods and mechanisms for backing up data in computer systems.

2. Description of the Relevant Art

There is an increasing need for organizations to protect data that resides on a variety of client devices via some type of backup mechanism. For example, numerous client devices may be coupled to a network that is coupled to a backup store. The backup store may comprise one or more backup servers, which may be further coupled to a disk storage unit, one or more tape drives or other backup media. A backup agent on each client device may convey data files to the media server for storage according to a variety of schedules, policies, etc. For example, large backup datasets may be moved from a client device to a media server configured to store data for later retrieval, thereby protecting data from loss due to user error, system failure, outages, and disasters, etc. as well as archiving information for regulatory compliance, workflow tracking, etc.

In order to make data more readily available and to reduce the storage capacity required, single-instance storage techniques may be used. In a single-instance storage system, data is typically stored in segments, with each segment having a fingerprint that may be used to unambiguously identify it. For example, a data file may be segmented, and a fingerprint calculated for each segment. Duplicate copies of data segments are replaced by a single instance of the segment and a set of references to the segment, one for each copy. In order to retrieve a backup file, a set of identifiers (e.g., fingerprints) is sent to the single-instance storage system, where it is compared to the fingerprints of data stored in a storage pool. For each matching fingerprint, a data segment is retrieved. The resulting segments may be re-assembled to produce the desired file.

When a new client device requires an initial backup of its data, the new client may utilize a single-instance backup mechanism described above. An initial backup requires all unique data segments, along with all the related metadata, whether unique or not from the new client to be conveyed to the data store via the network which results in heavy network traffic. As a consequence, performance of the available network may be reduced.

In view of the above, efficient backup methods and mechanisms are desired.

SUMMARY OF THE INVENTION

Systems and methods for efficient data backup in computer systems are disclosed. In one embodiment, a computer system includes one or more client devices coupled to a network. A backup store may also be coupled to the network. The backup store may comprise one or more backup servers, which may be further coupled to a disk storage unit, one or more tape drives or other backup media. A backup agent on each client device may divide data files into data segments. Each data segment is provided with a fingerprint value or hash. The hash values are unique unless two data segments are duplicates, in which case the two data segments have the same hash value. The hash values may form a local hash list.

When a new client device requires an initial backup of its data, the backup agent may be further configured to sort the local hash list by comparing hash values, finding duplicate values, and removing duplicates when they are found. The backup agent may then convey the sorted local hash list, and not the corresponding data segments, to the backup store via the network. The backup store may compare the sorted local hash list to a list of hash values corresponding to data segments already stored in the backup store. If a match is found, then the sorted local hash value, which corresponds to the new client data segment, has been previously backed up and already exists in the backup store. If no match is found, then the sorted local hash value corresponds to a new client data segment that is unique and has not been backed up. This hash value is added to a unique hash list.

Upon completion of the comparisons and creation of the unique hash list, the backup store may convey the unique hash list to the backup agent of the new client device via the network. In response to receiving the unique hash list, the backup agent may convey the unique hash list, those data segments in the new client device that correspond to the unique hash list and all the metadata in the new client device to the backup store. Upon receiving the conveyed information from the backup agent, the backup store is configured to add the information to its data store.

Figure 1:
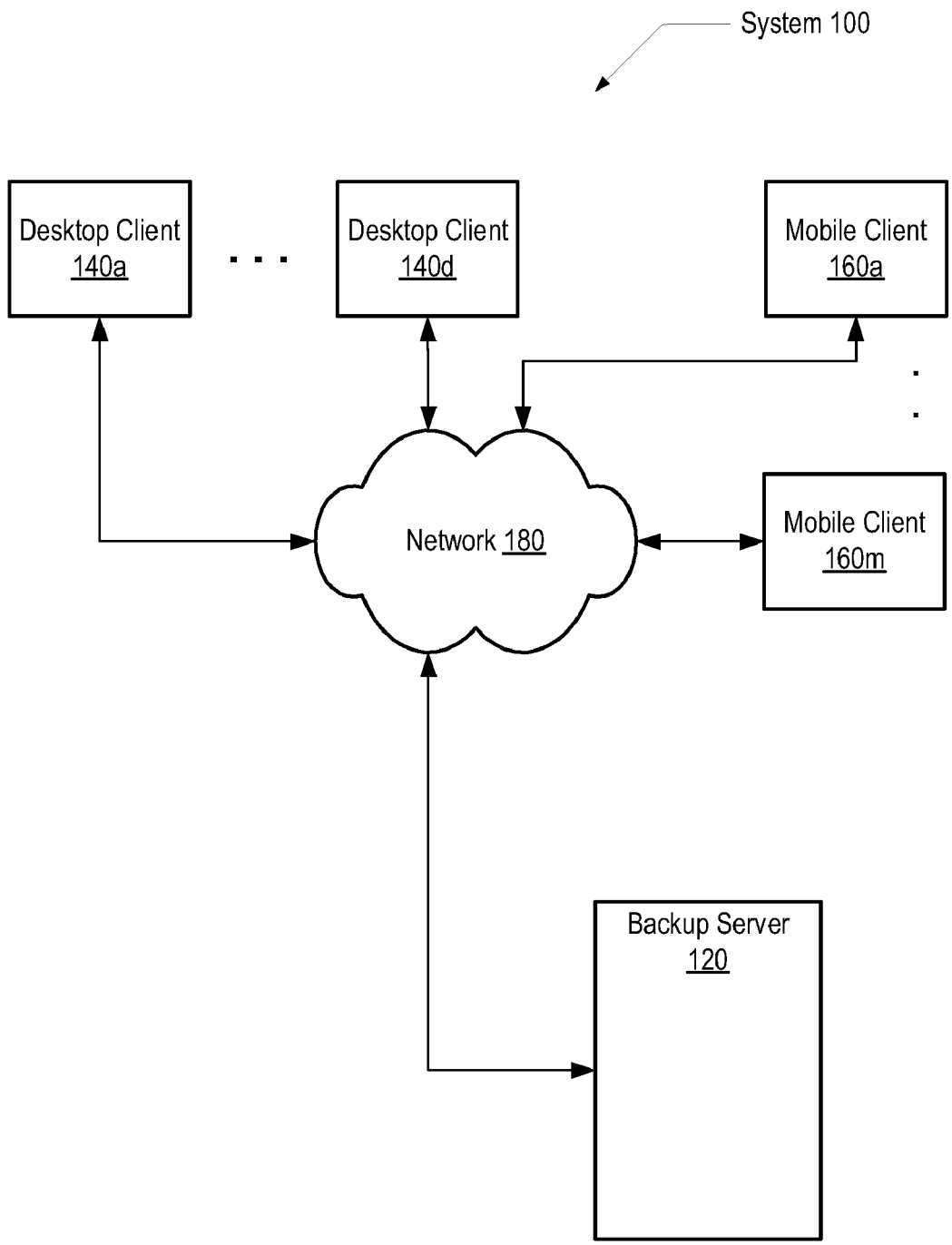
FIG. 1 is a block diagram illustrating a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Increased efficiency of an initial backup of data on a new client device in a computer system may be obtained by transmitting only data on the new client device that is unique. Unique data does not have a corresponding duplicate of itself on the backup store. A method that locates and transmits via a network only unique data between the new client device and the backup store may greatly reduce both the network traffic and the time required for the backup. Therefore, the network may be made more available for applications or other backups on the computer system. When a new client device is not able to efficiently backup its data, it may increase network traffic, which may reduce productivity of applications and other backups on the computer system. Also, an inefficient backup may delay or altogether prevent the new client device from participating in an organization's variety of backup schedules, policies, etc. Such backup policies may be used to move large backup datasets from a client device to a media server configured to store data for later retrieval, thereby protecting data from loss due to user error, system failure, outages, and disasters, and so on. Additionally, such backup procedures may be utilized for purposes of regulatory compliance, workflow tracking, etc.

Referring to FIG. 1, one embodiment of a computer system 100 is shown. In the example show, any number and different types of clients may be coupled via a network 180. For example, one or more desktop clients 140a-140d may be included in computer system 100. As used herein, elements referred to by a reference numeral followed by a letter may be collectively referred to by the numeral alone. For example, desktop clients 140a-140d may be collectively referred to as desktop clients 140. Any type of stationary computing device, such as personal computers, workstations, etc., may be included in desktop clients 140. Similarly, mobile clients 160a-160m may comprise any type of mobile computing device such laptops, personal digital assistants (PDAs), wireless handheld devices, etc. Both desktop clients 140 and mobile clients 160 may be coupled to network 180 by a variety of techniques including wireless connection, direct local area network (LAN) connections, wide area network (WAN) connections such as the Internet, and others. Network 180 may comprise one or more LANs that may also be wireless. Network 180 may further include remote direct memory access (RDMA) hardware and/or software, transmission control protocol/internet protocol (TCP/IP) hardware and/or software, and/or others. Backup server 120 may include a computer with hardware and software optimized for its intended purpose of data storage. For example, large disk drives, powerful fans, specialized uninterruptible power supplies, and so on may be used.

For protection purposes, such as for one or more design projects within an organization, a copy of data on client 140 or 160 may need to be stored on a storage medium inside backup server 120. In alternative embodiments, a copy of data may need to be stored on a storage medium separate from, but coupled to, backup server 120. In other embodiments, multiple copies of data may need to be stored on separate storage mediums coupled to backup server 120 and possibly other backup servers. Backup frequency and storage location may depend on a variety of factors including the urgency of data protection, availability of media storage space, network connection state, and enterprise policies.

One or more types of data protection software may be located on each client 140 and 160 and on backup server 120. In one embodiment, software performs data backups in the background while other applications are executing. When a client 140 or 160 is new to system 100 and requires data backup, the system may be configured to perform a data backup of only unique data on the new client and not which already exists on the backup server 120.

Figure 2:
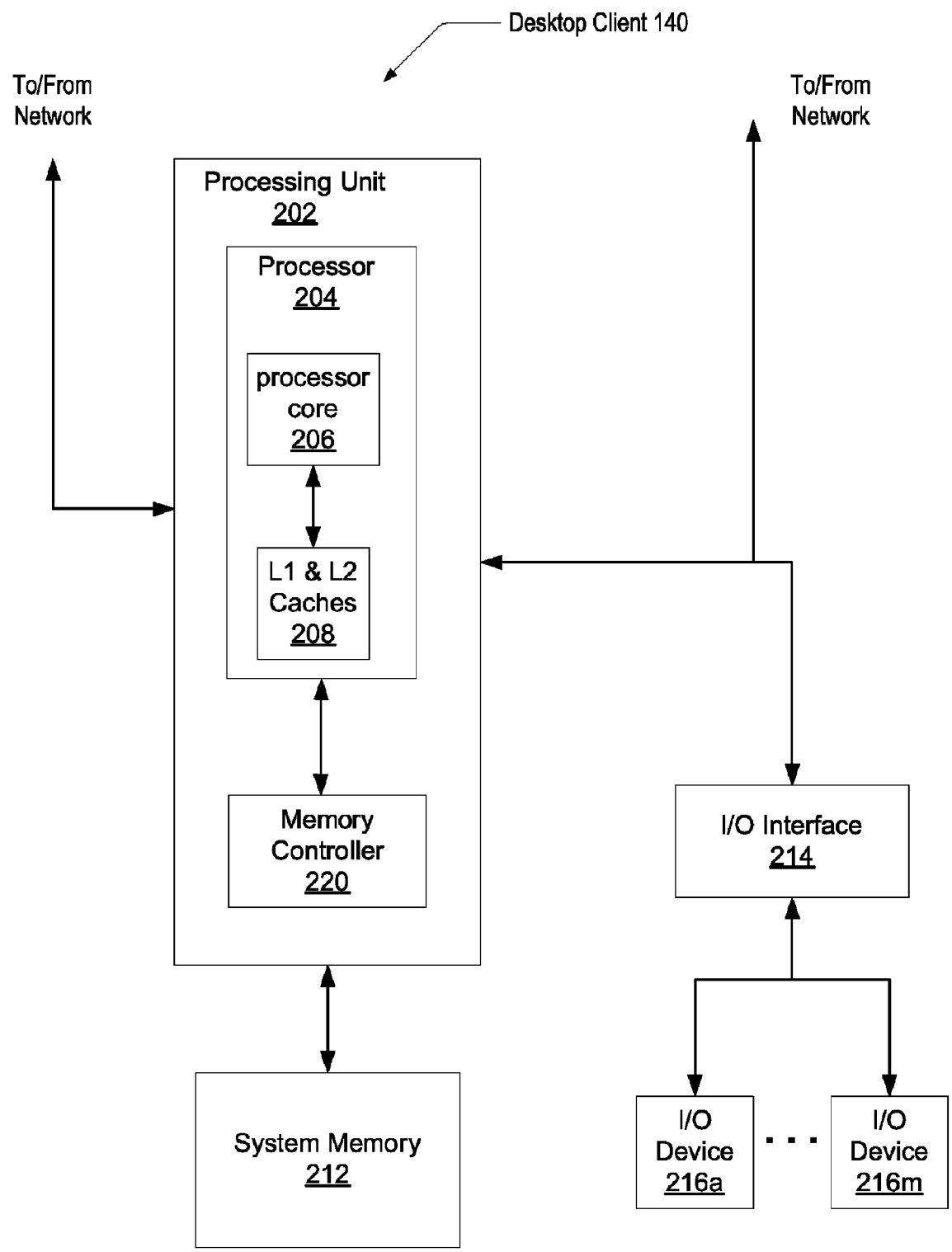
FIG. 2 is a block diagram illustrating one embodiment of a client device.

Referring now to FIG. 2, one embodiment of a client (mobile or otherwise) is shown. Interfaces between a network and processing unit 202 and between processing unit 202 and I/O Interface 214 may comprise any suitable technology. Processing unit 202 may comprise one or more processors 204. Each processor 204 may comprise at least one processor core 206 and one or more levels of caches 208. In alternative embodiments, each processor 204 may comprise multiple processor cores 206. The memory controller 210 may be coupled to system memory 212, which may include primary memory of RAM for processors 204. Alternatively, each processor 204 may be directly coupled to its own RAM. In this case each processor 204 may directly connect to a network rather than via memory controller 210.

In alternative embodiments, more than one processor 204 may be coupled to memory controller 210. In such an embodiment, system memory 212 may be split into multiple blocks with a block of system memory 212 coupled to each of the multiple processors 204 or to memory controller 210. Processing units 202 may communicate with other processing clients via a network. In one embodiment, desktop client 140 may have one or more operating systems and data protection software to perform data backup. An I/O Interface 214 is coupled to both a network and I/O devices 216a-216m. I/O devices 216 may include peripheral network devices such as printers, keyboards, monitors, cameras, card readers, hard disk drives and otherwise.

Figure 3:
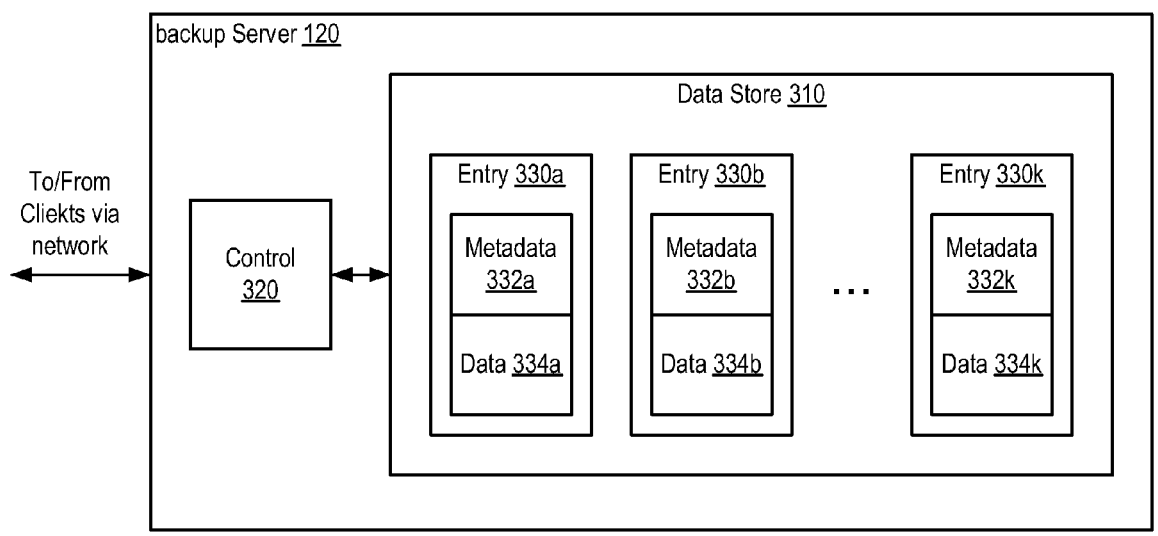
FIG. 3 is a block diagram of one embodiment of a backup server.

Turning now to FIG. 3, a block diagram of one embodiment of a backup server 120 is shown. Data store 310 comprises entries 330a-330k. Each entry 330 includes data 334 and associated metadata 332. Control 320 may comprise both hardware and software to interface backup server 120 to network 180 and be configured to perform operations for an efficient backup process of a new client to the computer system. Control 320 may comprise data protection software for this particular process.

During a backup operation, data protection software on a new client to the computer system may perform an initial backup of data on the new client to backup server 120. During the backup procedure, the client may transmit segments of data to the backup server 120 via network 180. Details of the segmentation process and creating a unique list of data segments are described in further detail below. Within backup server 120, control unit 320 may receive unique data segments and store the segments and metadata as one or more entries 330. Each entry 330 within data store 310 may include a data entity 334 and associated metadata 332 that includes the references to data entity 334 produced during creation of a unique list of data segments described below.

Figure 4:
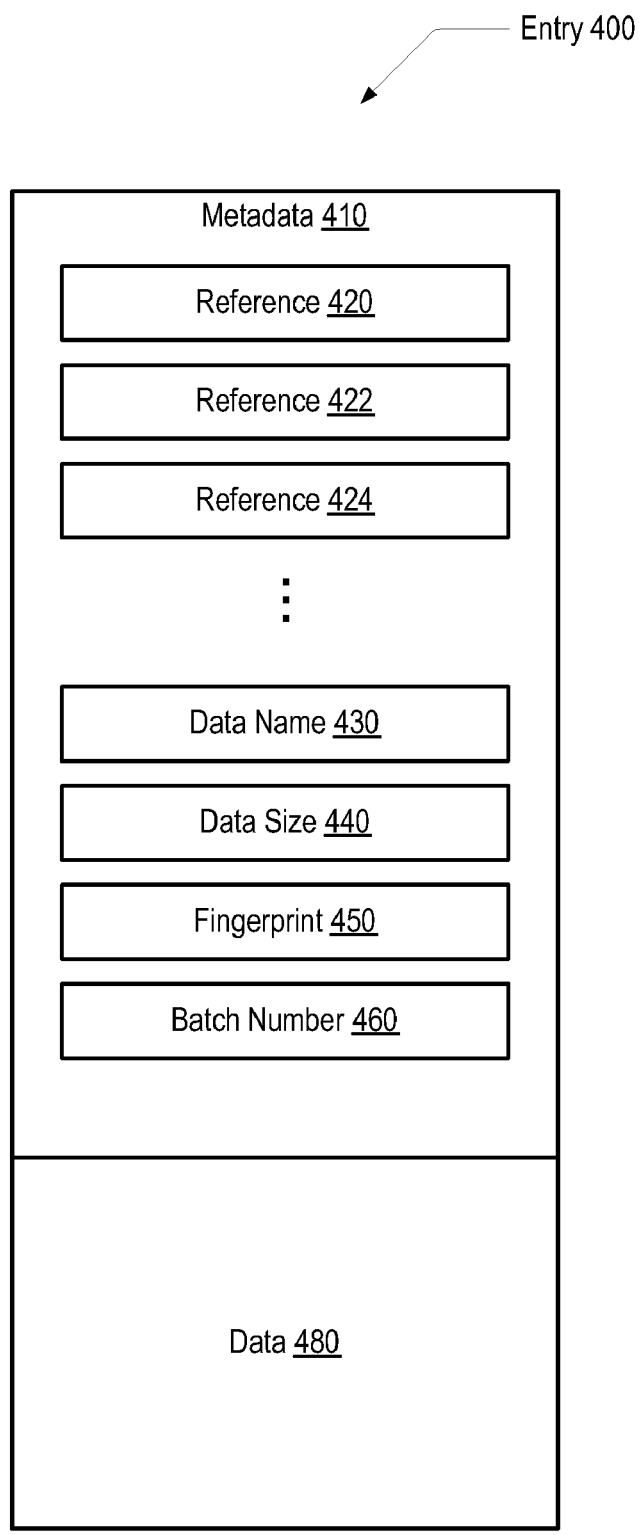
FIG. 4 is a block diagram illustrating one embodiment of a data store entry.

FIG. 4 is a block diagram of one embodiment of an entry 400 representing one of entries 330 in FIG. 3. Each entry 400 may include a metadata portion 410 and an associated data portion 480. Metadata 410 may include one or more references such as references 420, 422, and 424 as shown. Other data may be included as well, such as one or more of a data name 430, data size 440, a fingerprint 450 of data 430, a batch number 460, as well as type, version number, ownership, permissions, modification time, error code, etc. Batch number 460 may be used to identify the particular backup operation in which the associated entry 400 was created. Other forms of metadata and/or identifiers will be apparent to those of ordinary skill in the art.

Figure 5:
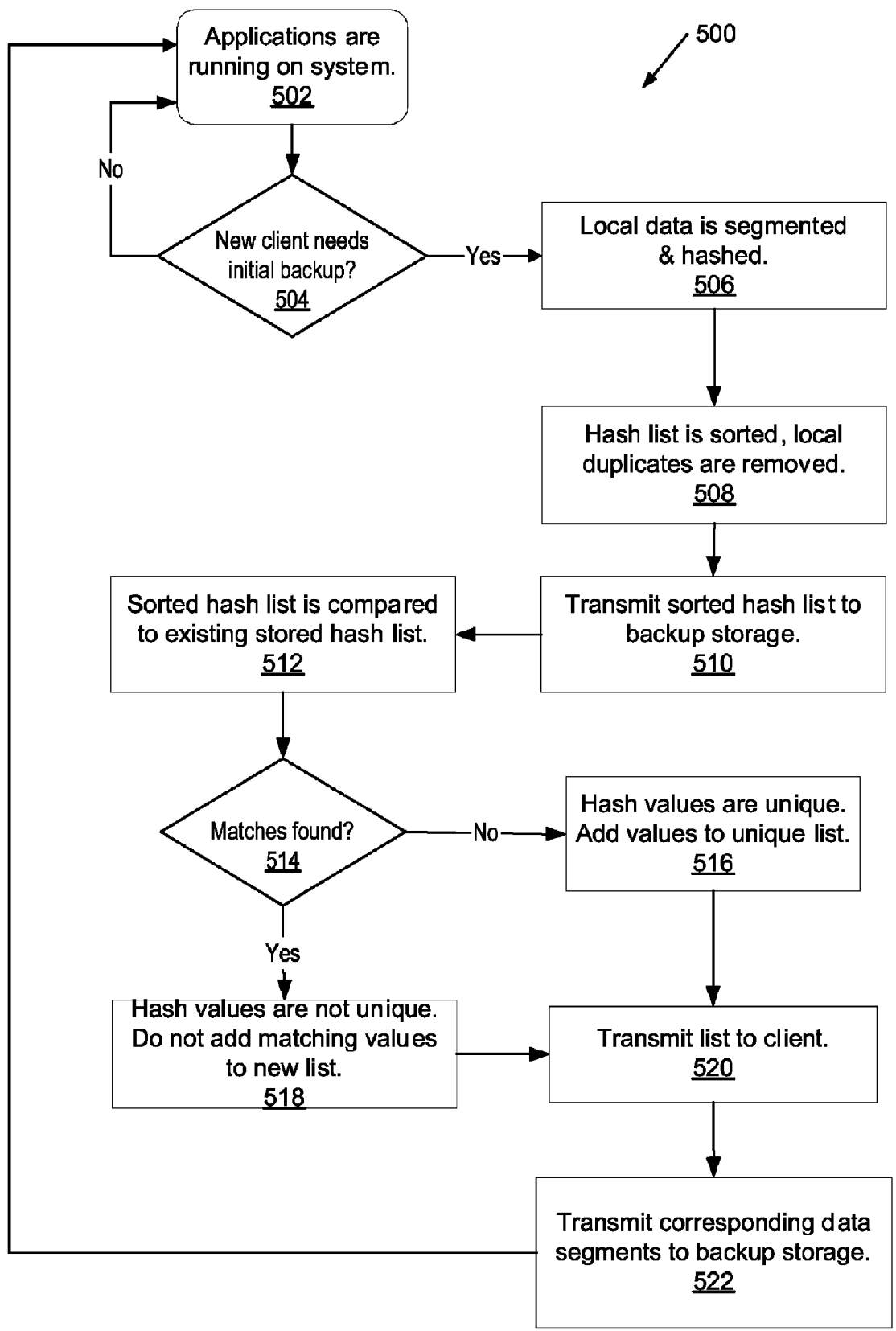
FIG. 5 is a flow diagram illustrating one embodiment of a method for efficient, initial backup of a new client device.

Turning now to FIG. 5, one embodiment of a method for an efficient, initial data backup for a new client in computer systems is illustrated. The components embodied in the computer system described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, applications or other software are running on clients in a computer system. Data on each client may be accessed and altered. A new client may be coupled to a network of the computer system. Some mechanism (e.g., OS, data protection software, or otherwise) may determine that the data residing on the new client needs to be backed up for protection purposes (decision block 504). The data may comprise both code and files of data to be accessed by the code or executing applications. In block 506, the new client's data that is to be backed up may be identified. For example a snapshot of the data at a given point in time may be created or otherwise established. Having identified the data, the data may be partitioned into data segments. A hash function, or any other suitable function, may then be utilized to create a fingerprint, or hash value, for each segment. Multiple types of algorithms exist for this purpose such as the Secure Hash Algorithm (SHA-1), Message-Digest algorithm 5 (MD5), Whirlpool, etc. The calculated hash values are placed in a hash list. Since the hash function is reproducible and duplicate segments will provide the same data inputs to the hash function, duplicate data segments may provide the same hash value.

In block 508, duplicate hash values may be removed from the newly created hash list. Equal values for two hash values may signify a data segment is duplicated at least once on the new client. In one embodiment, the newly created has list may be sorted by performing comparisons of the hash values in order to more easily identify duplicate values. However, numerous other techniques are possible and are contemplated for identifying duplicate values. In one embodiment, only one copy of any given hash value is retained in the (possibly sorted) hash list. Consequently, the sorted hash list may comprise a list of only unique hash values and each hash value corresponds to a different data segment on the new client.

The sorted hash list is then transmitted to a backup server via a network (block 510). The backup server may include a Single Instance Storage server. In response to receiving the sorted hash list, the backup server may perform a similar operation as was done on the new client in order to identify and remove duplicate hash value copies. Where it is understood such duplicates have already been removed, the backup server may not perform this operation. The hash values in the received sorted hash list are compared to hash values already resident on the backup server or on a backup medium coupled to the backup server (block 512). If a match is found in decision block 514, then the hash value in the received sorted hash list may not be unique (block 518) and this hash value corresponds to a data segment that already exists on backup storage. The corresponding data segment may have been previously stored during a prior backup of another client. This matching hash value is then removed from a list of hash values that will be used to backup corresponding data segments. By not adding this hash value to a new unique list or, alternatively, by removing this hash value from the sorted hash list in order to create a new unique list, time, network traffic, and data storage space may be reduced during the backup process. However, if a match is not found in decision block 514, then the hash value in the received sorted hash list may be deemed unique (block 516). This hash value corresponds to a data segment that does not already exist on backup storage. Consequently, this hash value may be added to a new unique list or, alternatively, the hash value may be maintained in the sorted hash list in order to create a new unique list used to identify data segments requiring backup.

The new unique hash list is then transmitted from the backup server to the new client via a network (block 520). In response to receiving the unique hash list, the new client may assemble the corresponding data segments for the unique hash list and transmit the corresponding data segments and all the metadata in the new client device to the backup server in block 522 of method 500. In one embodiment, the client may also convey the hash values corresponding to each of the transmitted data segments. The backup server may then store the received data segments and update its hash lists and other metadata as appropriate to indicate the data segments are stored therein. It is noted that in the described embodiment, this is the first time during method 500 that data segments are transmitted via the network. The number of data segments transmitted may be much smaller than the total number of data segments on the new client. Also, in general the earlier two transmissions of hash values between the client and backup server are of much smaller size than the data segments themselves. Therefore, network traffic may have been greatly reduced and the time and data storage space required by the backup server have been greatly reduced compared to sending one transmission of all hash values and all data segments on the new client to the backup server.

An alternative embodiment to method 500 may include the backup server requesting an initial backup of a new client in block 504. The backup server, as above, may include a Single Instance Store server. Blocks 506 and 508 occur as described above. In block 510, the client may transmit the sorted hash list, the corresponding data segments and all metadata to a local storage medium, rather than to the backup server. The local storage medium may include a USB disk drive, CD, DVD, tape drive or other storage medium. Then the local storage medium may be relocated to the backup server or a computer near the backup server. This step removes the use of a network, which may be a low-speed, high-latency network. The steps involved in blocks 512-518 concerning the actions in the backup server remain the same. In block 520, the backup server directly transmits a unique list to the local storage medium or to the computer coupled to the local storage medium, rather than to the new client via the network. In step 522, the source for the unique hash list, corresponding data segments metadata is the local storage medium or the computer coupled to the local storage medium.

Another alternative embodiment of method 500 may include an existing backup of the new client, possibly created from a different method. In block 504, the existing backup may be restored to a computer or an alternate server near the backup server. The backup server, again, may comprise a Single Instance Storage server. The restored backup data may be transmitted from the computer, or the alternate server, to the backup server via a high-speed, low-latency connection. The steps in blocks 506 to 522 proceed as described above. The final unique hash list should be small, since possibly much of the data on the new client is already stored on the backup server.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a plurality of clients; and
a backup server coupled to a single-instance data store, said single-instance store being configured to store backup data for each of the plurality of clients, wherein said backup data includes only a single instance of any data that is stored on the plurality of clients with no duplication in the single-instance store;
wherein a client of said clients requesting data backup is configured to:
identify a plurality of data segments to be backed up;

generate a first list of fingerprints including a fingerprint for each of the plurality of data segments;
remove duplicate fingerprints from the first list; and
convey the first list to the backup server;
wherein in response to receiving the first list, the backup server is configured to:
identify first fingerprints included in the first list which match fingerprints of data segments stored in the single-instance data store; and
convey a second list to the client, the second list comprising the fingerprints of the first list without the first fingerprints;
wherein the client is configured to convey for backup, data segments of the plurality of data segments identified by the second list.

2. The computer system of claim 1, wherein the client is further configured to convey a corresponding fingerprint for each of the data segments conveyed for backup when conveying the data segments of the plurality of data segments identified by the second list.

3. The computer system of claim 1, wherein for each data segment stored in the single-instance data store, there is stored a batch number used to identify a corresponding backup operation in which an associated entry storing the data segment was created.

4. The computer system of claim 2, wherein the client is further configured to convey the metadata for all data segments on the client when conveying the data segments of the plurality of data segments identified by the second list.

5. The computer system as recited in claim 4, wherein in response to receiving the corresponding fingerprints and the conveyed data segments from the client, the backup server is further configured to add the corresponding fingerprints and the conveyed data segments to the single-instance data store.

6. The computer system as recited in claim 1, wherein for each data segment stored in the single-instance data store, there is stored a fingerprint that identifies the data segment and a reference to each client from which a copy of the data segment was received for backup.

7. The computer system as recited in claim 6, wherein the fingerprints identifying the data segments are encrypted.

8. A method for backing up data, the method comprising:
identifying a plurality of data segments of a client to be backed up;
generating a first list of fingerprints including a fingerprint for each of the plurality of data segments;
removing duplicate fingerprints in the client from the first list;
conveying the first list to a backup server;
identifying first fingerprints included in the first list which match fingerprints of data segments stored in a single-instance data store, said single-instance store being configured to store backup data for each of a plurality of clients including said client, wherein said backup data includes only a single instance of any data that is stored on the plurality of clients with no duplication in the single-instance store;
conveying a second list from a backup server to the client, the second list comprising the fingerprints of the first list without the first fingerprints; and
conveying for backup from the client, data segments of the plurality of data segments identified by the second list.

9. The method of claim 8, further comprising conveying a corresponding fingerprint for each of the data segments conveyed for backup when conveying the data segments of the plurality of data segments identified by the second list.

10. The method of claim 8, wherein for each data segment stored in the single-instance data store, there is stored a batch number used to identify a corresponding backup operation in which an associated entry storing the data segment was created.

11. The method of claim 9, further comprising the client conveying the metadata for all data segments on the client when conveying the data segments of the plurality of data segments identified by the second list.

12. The method as recited in claim 11, wherein in response to receiving the corresponding fingerprints and the conveyed data segments from the client, the method further comprises the backup server adding the corresponding fingerprints and the conveyed data segments to the single-instance data store.

13. The method as recited in claim 8, wherein for each data segment stored in the single-instance data store, there is stored a fingerprint that identifies the data segment and a reference to each client from which a copy of the data segment was received for backup.

14. The method as recited in claim 13, wherein the fingerprints identifying the data segments are encrypted.

15. A plurality of computer readable storage media comprising program instructions which are executable to:
identify a plurality of data segments of a client to be backed up;
generate a first list of fingerprints including a fingerprint for each of the plurality of data segments;
remove duplicate fingerprints from the first list;
convey the first list to a backup server;
identify first fingerprints included in the first list which match fingerprints of data segments stored in a single-instance data store, said single-instance store being configured to store backup data for each of a plurality of clients including said client, wherein said backup data includes only a single instance of any data that is stored on the plurality of clients with no duplication in the single-instance store;
convey a second list from a backup server to the client, the second list comprising the fingerprints of the first list without the duplicate fingerprints; and
convey for backup from the client, data segments of the plurality of data segments identified by the second list.

16. The storage media of claim 15, wherein the program instructions are further configure to convey a corresponding fingerprint for each of the data segments conveyed for backup when conveying the data segments of the plurality of data segments identified by the second list.

17. The storage media of claim 15, wherein for each data segment stored in the single-instance data store, there is stored a batch number used to identify a corresponding backup operation in which an associated entry storing the data segment was created.

18. The storage media of claim 16, further comprising the client conveying the metadata for all data segments on the client when conveying the data segments of the plurality of data segments identified by the second list.

19. The storage media as recited in claim 18, wherein in response to receiving the corresponding fingerprints and the conveyed data segments from the client, the method further comprises the backup server adding the corresponding fingerprints and the conveyed data segments to the single-instance data store.

* * * * *